Feb. 9, 1960 E. R. KRETZMER 2,924,711

MULTILEVEL QUANTIZER

Filed Nov. 21, 1956 2 Sheets-Sheet 1

INVENTOR
E. R. KRETZMER
Harry C. Hart
ATTORNEY

Feb. 9, 1960 E. R. KRETZMER 2,924,711

MULTILEVEL QUANTIZER

Filed Nov. 21, 1956 2 Sheets-Sheet 2

INVENTOR
E. R. KRETZMER
BY Harry C. Hart
ATTORNEY 2,924,711

MULTILEVEL QUANTIZER

Ernest R. Kretzmer, New Providence, N.J., assignor to Bell Telephone Laboratories, Incorporated, New York, N.Y., a corporation of New York Application November 21, 1956, Serial No. 623,733

5 Claims. (Cl. 250—27)

This invention relates to apparatus for converting a message signal having a continuous range of signal amplitudes into one having a finite number of discrete values, this conversion being generally known as signal quantization. It has for its principal object so to improve the transfer characteristic of such apparatus that the output signal will approach as closely as possible a staircase wave form having flat "treads" and vertical "risers." A related object is to increase the ability of a quantizer circuit to switch between states faster than the fastest transition of a communication signal, for example, a video signal.

Many information transmission systems employ a process of sampling a modulated input signal and quantizing the derived samples, the envelope of which contains the message information, into a number of discrete values, thereby permitting the samples to be encoded according to any one of a number of schemes prior to transmission. By way of example, a number of systems employing signal quantization are described in the article "Pulse Code Modulation," by H. S. Black and J. O. Edson, published in 1947 in the Transactions of the American Institute of Electrical Engineers, vol. 66, at pages 895 to 899.

Quantization may be defined conveniently as the representation of a continuous range of signal amplitudes by a finite number of discrete steps or values, a quantum being the difference between two adjacent values. It is evident that a quantizer employed to effect such a representation should be as nearly ideal as possible. An ideal quantizer is a device that has a transfer characteristic having zero transmission throughout each tread portion of the characteristic, and infinite gain throughout the riser portions.

In an application of B. M. Oliver, Serial No. 203,652, filed December 30, 1950, now Patent 2,773,980 granted December 11, 1956, a circuit arrangement is described that is eminently suitable for effecting this representation. The quantizer circuit described therein employs an amplifier whose gain is a function of its cathode network impedance and in which a number of networks connected in the cathode circuit, each controlled by a particular control level voltage, are utilized to establish a plurality of conduction states of the amplifier. Included in each cathode connected network is a switching circuit which may conveniently comprise a number of asymmetrically-conducting devices such as crystal diodes. When the instantaneous amplitude of an input signal falls between a particular pair of control level voltages, a representative conduction state or output condition of the amplifier signifies the particular relation of the input signal amplitude to the predetermined control level. The conduction state of the amplifier is established according to this relationship. It has been found, however, that in a quantizer wherein the switching network employed to control amplifier gain includes crystal diodes, undesirable grid-to-plate transmission, produced primarily because of the insufficiently high value of the quantizer cathode impedance encountered during the respective conduction states, prevents realization of an ideal output characteristic.

Similarly, the transfer characteristic of a quantizer should have extremely high gain and rapid response during the riser portion of the input-output characteristic to insure very high switching speed so that intermediate signal amplitudes (i.e., signal values appearing between treads) are not lost, but rather are included in one of the steps of the quantized output signals. Steepness of the riser depends to a large extent upon the characteristics of the diode elements employed in the cathode switching circuit. Specifically, the non-zero forward resistance of the diodes hinders the attainment of a quantizer having an ideally steep riser. Moreover, the properties of the quantizer driver stage, and in particular the cathode driving impedance, affects quantizer performance and prevents the ideal riser characteristic from being realized.

In accordance with the present invention the objectionable results above described are to a large extent mitigated by introducing proper amounts of a signal related to the quantizer input signal to the quantizer output to compensate for certain undesirable transmission components. The compensation signal, which is chosen to be substantially equivalent to the negative values of the undesired transmission components, virtually cancels out these components to yield an improved quantizer output signal characteristic having nearly zero slope throughout each tread portion of the staircase wave.

According to another feature of the invention, the gain throughout the riser portion of the characteristic is materially increased through a reduction of the cathode impedance of the driver stage by means of negative feedback.

The invention will be fully apprehended from the following detailed description taken in connection with the appended drawings in which.

Figure 1:
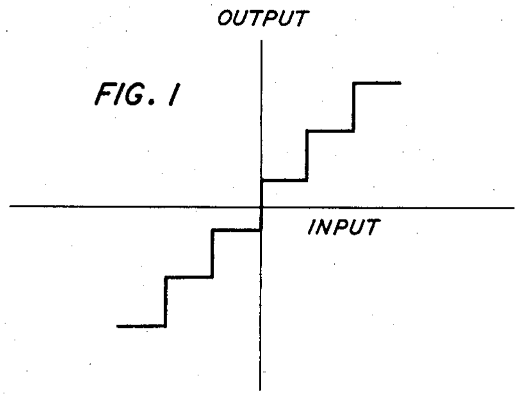
Fig. 1 is a graph showing the transfer characteristic of an ideal quantizer.

Referring now to the drawings, Fig. 1 shows in graphical form the input-output response characteristic of an ideal quantizer; i.e., one having flat "treads" and vertical "risers." As the input signal increases the output progresses step-wise so that the output is constant for each of a number of ranges of input value and exhibits infinite slope at the points between these constant ranges. It will be readily apparent that this type of response is characteristic of an amplifier having infinite gain for a finite number of input levels, and having zero transmission for any other input value.

Figure 2:
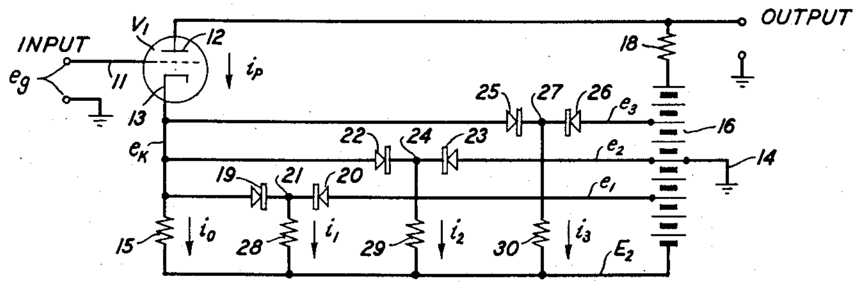
FIG. 2 (PRIOR ART)
Fig. 2 is a schematic diagram of a basic multilevel quantizer circuit of the type described in the aforementioned Oliver application.

An amplifier which has a response approaching this ideal is illustrated in Fig. 2, this circuit being fully described in the aforementioned Oliver application. In Fig. 2 the quantizer comprises a vacuum tube amplifier $V_1$ having a control grid 11, an anode 12 and a cathode 13. The anode-cathode circuit of the amplifier includes serially connected load impedance 18, a multilevel voltage source 16, and a cathode impedance 15. The circuit further includes a plurality of switching paths connected between the cathode 13 and intermediate points of reference potential $e_1$, $e_2$, and $e_3$ in source 16. The output signal is developed between the anode 12 and a reference ground potential point 14.

One of the switching paths comprises, for example, the serially connected asymmetrical conducting devices 19 and 20 connecting the cathode 13 to the reference potential point $e_1$, which have their like electrodes connected at a common junction point 21. This junction point is returned to the negative terminal of source 16 (designated voltage $E_2$) through the impedance 28. The other paths including, respectively, devices 22, 23, and 25, 26, similarly connect the cathode 13 to reference potential points $e_2$ and $e_3$. The impedances 29 and 30 return, respectively, the junction points 24 and 27 to the common supply voltage $E_2$. Impedances 28, 29, and 30 may be of approximately the same magnitude as the cathode impedance 15. While only three switching paths are shown, it is evident that the total number of such paths depends upon the desired number of discrete levels of conduction for the vacuum tube $V_1$. For the three paths illustrated, therefore, four conduction states or quantization levels are obtained.

As described more fully in the aforementioned Oliver application, the diode junctions may be returned alternately to positive and negative supply voltages (the diodes being poled in the reverse direction when returned to a positive voltage point), without affecting the basic operation of the quantizer. Actually, such a refinement produces a quantizer having a staircase characteristic more nearly approaching the ideal characteristic of Fig. 1, and such a modified circuit is employed in the preferred embodiment of the invention illustrated in Fig. 5.

Considering now the operation of the quantizer circuit of Fig. 2, assume that an input signal $e_g$, from any convenient source providing a signal having a continuous range of amplitude, is applied to quantizer grid 11. Assume further that the signal has an initial potential value which is negative with respect to the level of the reference voltage $e_1$ and is progressively increased. The voltage $e_k$ of the cathode similarly increases while the current $i_0$ through the cathode impedance 15 changes rather slowly, having a rate of change which depends on the total resistance of the cathode circuit. Considering now the switching circuit including diodes 19 and 20, positive current assumed to have a value $i_1$ flows from the terminal $e_1$ of source 16 through diode 20 in the forward direction as indicated by the arrowhead, and through impedance 28 to the negative terminal of source 16. Since diode 20 has a low impedance to this current flow, junction point 21 has a potential substantially equal to that of reference voltage $e_1$. So long as $e_k$ is negative with respect to $e_1$, diode 19 is in its high impedance or low conduction state. With junction point 21 effectively isolated from the cathode $e_k$, current $i_1$ is supplied entirely from voltage tap $e_1$ through diode 20, while the plate current $i_p$ equals $i_0$ and is determined solely by the values of $e_k$ and impedance 15.

As voltage $e_g$ is futrher increased, the cathode potential $e_k$ increases also and a point is eventually reached at which the cathode voltage $e_k$ is equal to the reference potential $e_1$. Since this is also the potential of junction point 21, diode 19 now begins to conduct. When diodes 19 and 20 are both conducting, they form a low-resistance path between the cathode and tap $e_1$ on source 16, thereby giving the stage relatively high gain. Thus, as $e_k$ passes through the condition $e_k=e_1$, there is a sudden sharp transition or rise in the tube current, and current $i_1$ is now supplied from cathode 13 through diode 19, yielding a tube current $i_0+i_1$. Since the value of the parallel combination of impedances 15 and 28 is still large compared to that of the series combination of devices 19 and 20 in their conductive states, there is again a relatively constant conduction state and there will be no further rapid change in the current flowing through impedance 18 so long as the level of the cathode voltage $e_k$ remains more positive than reference level $e_1$, and less than $e_2$.

With several such switching circuits connected between the cathode and the respective voltage points $e_1$, $e_2$ and $e_3$, it is evident that as $e_k$ exceeds the amplitude of each of these reference levels in turn, the respective diodes 22 and 25 will conduct thereby successively placing resistors 29 and 30 in parallel with the cathode impedance 15. The net current $i_p$ will be equal, in turn, to the sum of the current $i_0$, and currents $i_1$, $i_2$ and eventually $i_3$. Such a process of adding one component of current as each reference level is reached and exceeded continues until the highest level has been exceeded. Hence, each separate level of conduction represents one quantum value of the input signal $e_g$ and the output is substantially a representation of the continuous range of input signal values expressed as a finite number of discrete levels or steps.

Figure 3:
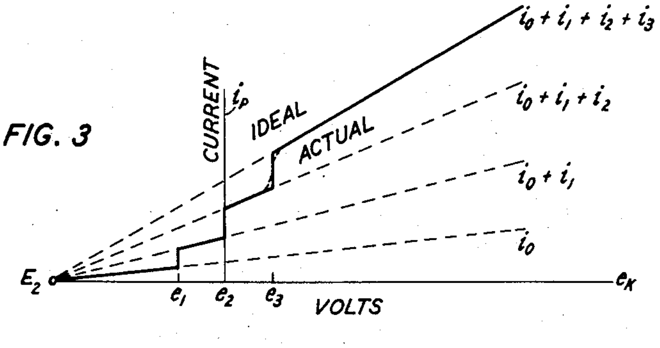
Fig. 3 is a graphic representation of the transfer characteristic of the quantizer of Fig. 2.

In Fig. 3 the above-described conditions are represented in graphic form. In this graph the abscissa represents the cathode voltage of the quantizer while the ordinate represents plate current. The voltage level of the cathode signal $e_k$ is shown increasing to the right from a voltage $E_2$ representing the negative reference potential of source 16. The reference level voltages $e_1$, $e_2$, and $e_3$ are located at points along the abscissa. The anode current $i_p$ is represented by the solid line portion of the characteristic and the several dashed line curves represent the current $i_0$ flowing through the cathode impedance 15, and the sum of $i_0$ and the currents flowing in the various switching paths. For example, in the region in which $e_k$ is less than $e_1$, the anode current is equal to $i_0$, and in the regions in which $e_k$ is between $e_1$ and $e_2$, the anode current is equal to the sum of $i_0$ and $i_1$. Although the ideal transition, occurring during the periods at which $e_k$ is substantially equal to the respective reference level voltages, is a sharp rise having infinite slope, the actual transition with rounded corners, shown as a dashed line, results primarily because of the non-zero value of the cathode impedance during the transition time. This condition results in part from the finite forward impedance of the diode elements and in part from the finite transconductance of $V_1$.

Furthermore, the non-zero slope of each step or tread results from undesirable grid-to-plate transmission produced because of an insufficiently high value of quantizer cathode resistance between switching states. This slope would initially be zero only if the quantizer cathode resistor was infinite in value. As the additional finite resistors 28, 29, and 30 are successively connected to the cathode, the grid-to-plate transmission progressively increases as shown in Fig. 3, thereby making the treads progressively steeper.

As mentioned above, the tread-slope characteristic of the multilevel quantizer of Fig. 2 may be to some extent improved by returning the diode junctions alternately to positive and negative supply voltages so that the tread slope is more nearly constant. However, the treads of the staircase characteristic of such a quantizer still have rising slopes which results in an output characteristic which is, in many applications, undesirable.

It is evident that an improvement of both the tread and riser portions of the characteristic presents conflicting demands on the quantizer anode-cathode circuit. A sharp riser, one having extremely high slope, requires a low cathode impedance during the riser periods. On the other hand, a flat tread should have zero slope and this occurs only when the cathode impedance is very high.

The present invention makes it both feasible and economical to meet these conflicting demands and, at the same time, makes possible the production of a quantizer eminently suitable for the handling of wide band communication signals.

Figure 4:
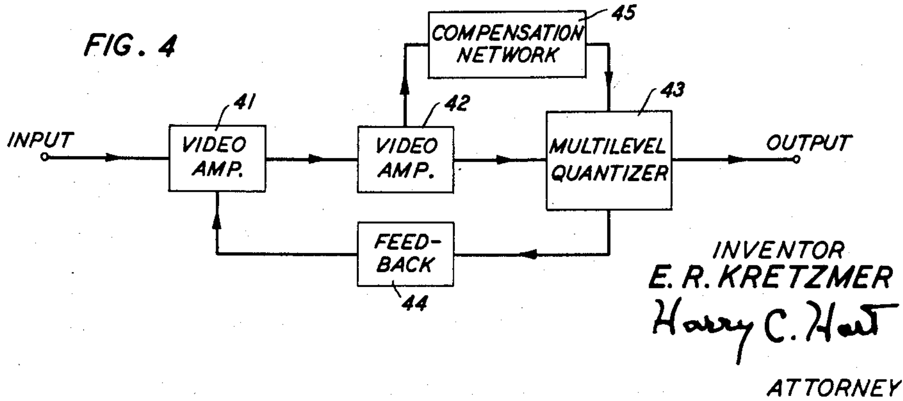
Fig. 4 is a block diagram illustrating a multilevel quantizer in accordance with the invention.

The detrimental effects outlined above are effectively overcome, according to the present invention, in the multilevel quantizer illustrated in block diagram form in Fig. 4. Briefly, an input signal from a conventional signal source, for example, a video signal source, is applied to video amplifier 41 and in turn to video amplifier 42. These amplifiers, which may be of any well known type, are used to amplify the video input signal in order to supply a signal of adequate amplitude level to drive multilevel quantizer 43, which may take the form illustrated in Fig. 2.

In accordance with the invention, the undesirable grid-to-plate transmission responsible for the rising tread slope is cancelled out by additionally applying a portion of the input signal from amplifier 42 to the quantizer 43 by means of a compensation network 45. The value of the compensating signal derived from network 45 is properly adjusted to make the cancelling transmission component just equal to the negative of the undesired transmission. A 180° phase shift is necessary for this and it is within the scope of the invention to employ any well-known means for achieving such a phase reversal.

The properties of the driver stage also affect the quantizer performance. As pointed out above, the cathode driving impedance should be as small as possible to maximize the riser slopes. In the present invention, this impedance is substantially reduced by means of negative feedback 44 applied from quantizer 43 to the amplifier 41. As a result, the quantizer cathode impedance is very low, follows the input signal faithfully, and the riser portion of the characteristic is extremely steep.

Figure 5:
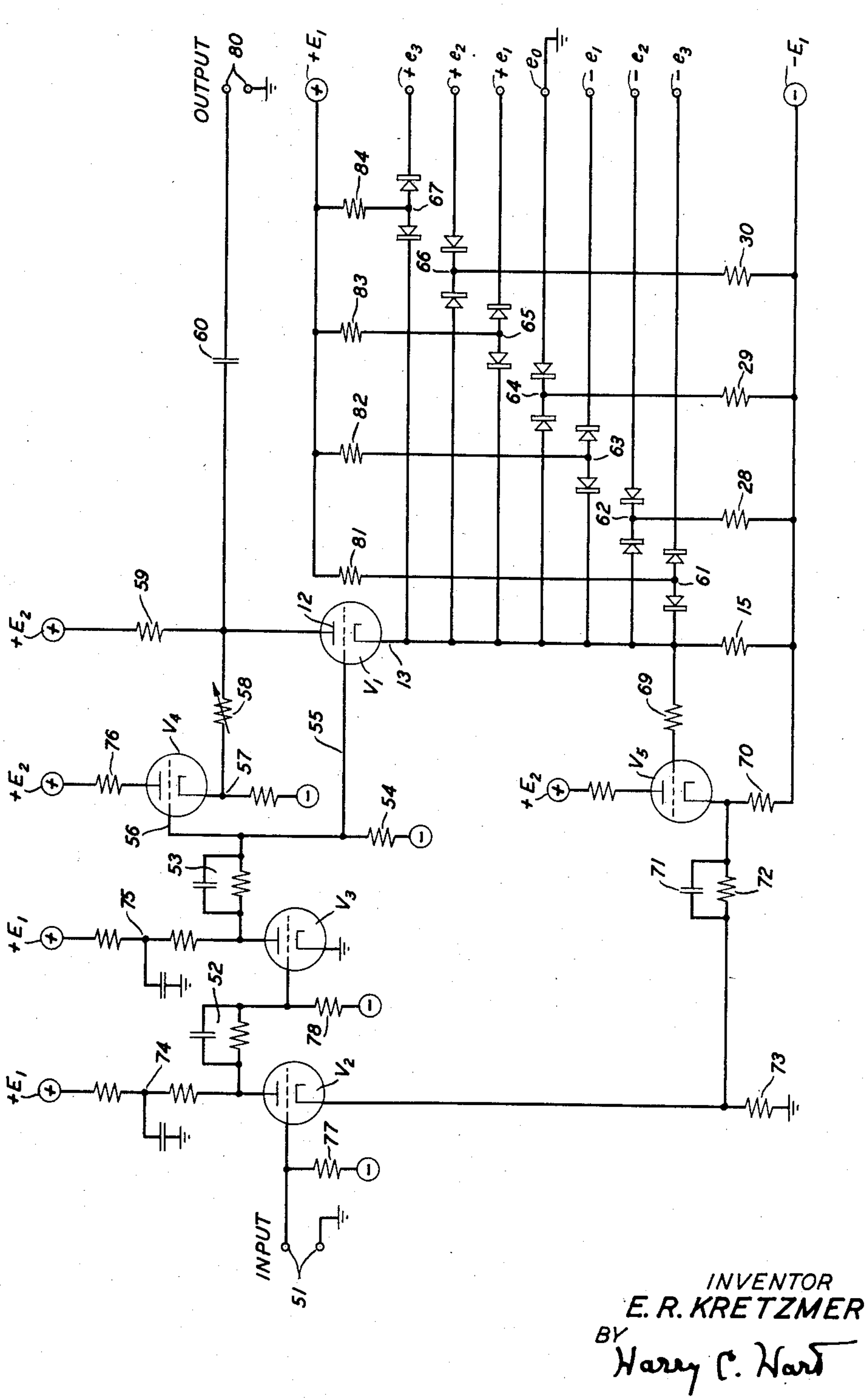
Fig. 5 is a schematic circuit diagram illustrating the details of a preferred embodiment of the improved multilevel quantizer of the invention.

Fig. 5 illustrates in schematic fashion a preferred embodiment of the invenion. In Fig. 5 an input signal applied to input terminals 51 is amplified in direct-current coupled amplifiers including tubes $V_2$ and $V_3$, respectively, and subsequently applied to the grid 55 of the quantizer circuit including amplifier tube $V_1$, and to the grid 56 of tube $V_4$ which is operated as a cathode follower amplifier and forms a part of the compensation network. The networks 52 and 53 coupling these amplifier stages are voltage divider circuits from which the necessary direct-current grid voltages are obtained. Each coupling network has a transmission loss at low frequencies which is compensated for by the effect of the RC networks 74 and 75 coupling the anodes of tubes $V_2$ and $V_3$ to the positive potential source $+E_1$.

By means of the switching networks 61 through 67 connected between the cathode 13 of quantizer amplifier $V_1$ to reference potentials $-e_3$ to $+e_3$, respectively, some of the resistors 28 through 30, and 81 through 84 are connected in parallel with the cathode resistor 15 depending on the instantaneous voltage applied to the grid 55 of $V_1$, as heretofore described. Thus, for any value of grid signal either three or four of the seven resistors 28 through 30, 81 through 84 will be in parallel with resistor 15, thus keeping the grid-to-plate transmission fairly uniform but nevertheless excessive for many purposes. By means of the seven switching networks, the video signal appearing at the grid 55 of amplifier $V_1$ is quantized to eight levels. The output signal is coupled from the anode 12 of $V_1$ through capacitor 60 to the output terminals 80. In order to further make the treads of the characteristic curve as level as possible before compensation, the voltages $+E_1$ and $-E_1$ are chosen to be relatively large and the shunting impedances 28, 29, etc. are chosen to be of high value.

In order to compensate for the grid-to-plate transmission resulting from switching circuit deficiencies, the input video signal derived from video amplifier $V_3$ is applied to the quantizer output by means of the compensation network comprising the cathode follower amplifier $V_4$ and impedance 58. A signal in phase with the one appearing at the grid 55 of quantizer $V_1$ is developed at the junction 57 at the cathode of the tube $V_4$ and is coupled by means of impedance 58 to the anode 12 of the quantizer $V_1$. This signal is 180° out of phase with the output signal as initially required. The impedance 58 is selected to be approximately equal in value to the average value of the shunting impedances in the cathode circuit of the quantizer stage, this being the value required to make the compensation transmission component just equal to the negative of the undesired transmission. An adjustable impedance may be employed in this respect, to permit subsequent variation of the value of the compensation transmission component. As a result, the signal supplied at output terminals 80 has a finite number of discrete levels, and approaches a staircase characteristic having flat treads.

Since good switching performance demands a low quantizer cathode impedance, negative feedback is employed to achieve this. The feedback path is from the quantizer cathode 13 to the junction of the cathode of video amplifier $V_2$ and its cathode resistor 73, and includes resistor 69, buffer $V_5$ connected as a cathode follower amplifier and the parallel combination of capacitor 71 and resistor 72. The cathode follower amplifier $V_5$, whose cathode is coupled to source $-E_1$ by means of resistor 70, is inserted in the feedback path in order to minimize loading of the quantizer cathode circuit. By means of this feedback, the output impedance of the quantizer amplifier $V_1$ is reduced by approximately 20 to 1 in the low and mid-frequency range. Hence, the periods of switching are of extremely short duration, i.e., the risers are nearly vertical, and the quantizer is manifestly capable of switching between adjacent levels at an extremely fast rate.

The quantizer of Fig. 5, therefore, overcomes both of the primary deficiencies of quantizers employing diode switching networks, thereby materially improving the staircase output characteristic. Accordingly, the quantizer is manifestly suitable for handling information signals satisfactorily.

It is to be understood that the above-described arrangements are illustrative of the application of the principles of the invention. Numerous other arrangements may be devised by those skilled in the art without departing from the spirit and scope of the invention.

What is claimed is:

1. A multilevel quantizing system comprising means supplied with a source of input message signals for amplifying said signals, a quantizing network including an amplifier having a cathode, an anode, a control grid and having an output terminal connected to said anode supplied with the resulting amplified signals, said quantizing network having a finite grid-to-plate transmission component, compensation means connected between said means for amplifying said signals and said output connection for deriving from said signals a compensation signal equal to the negative of said grid-to-plate transmission component, and means for applying said compensation signal to said output connection.

2. A multilevel quantizer according to claim 1 wherein said means for amplifying said signals comprises at least two direct-coupled amplification stages.

3. A multilevel quantizer circuit comprising an input terminal adapted to have applied thereto a message signal, an amplifying element having a cathode, a control element and an anode, an output terminal connected to said anode, means for connecting said input terminal to said control element, an anode-cathode circuit which includes in series a load impedance, a multipotential source and a cathode impedance, a plurality of switching paths, each including a pair of oppositely poled asymmetrically-conducting devices connected between said cathode and a different point of intermediate potential in said multipotential source, a current path including an impedance element for each of said switching paths extending from the junction of said pair of asymmetrically-conducting devices to a point in said output circuit at a reference potential, means including a cathode follower and a resistor for introducing a component of said massage signal into said output terminal shifted in phase as compared with components of said message signal introduced into said output terminal from said amplifying element thereby effectively to increase the value of said cathode impedance for a first component of said message signal, and feedback means connected between said cathode and said input terminal for effectively decreasing the value of said cathode impedance for a second component of said message signal.

4. Quantizing apparatus comprising in combination an input terminal adapted to receive a message signal to be quantized, an output terminal, first amplifier means connected between said input terminal and said output terminal having an anode, a cathode, and at least one control element, means for connectig said input terminal to said control element, means for connectig said anode to said output terminal, a plurality of switching networks connected to said first amplifier for respectively altering the gain of said first amplifier, said switching networks being responsive to the amplitude of said message signal, second amplifier means connected as a cathode follower between said input terminal and said output terminal for supplying to said output terminal a component of said message signal shifted in phase 180 degrees as compared with components of said message signal supplied to said output terminal from said first amplifier, said second amplifier means having a regulating element and an output connection, means connecting said input terminal to said regulating element, and adjustable impedance means connecting said output connection to said output terminal.

5. A multilevel quantizing system comprising an amplification stage adapted to have applied thereto an input signal, an output circuit, quantizing means establishing a first connection between said amplification stage and said output circuit, compensation means including a second connection between said amplification stage and said output circuit for imparting to said output circuit a component of said input signal 180 degrees out of phase with respect to components of said input signal developed by said quantizing means, and negative feedback means connected between said quantizing means and said amplification means.

References Cited in the file of this patent

UNITED STATES PATENTS

| | | |
|---|---|---|
| 2,486,391 | Cunningham | Nov. 1, 1949 |
| 2,602,918 | Kretzmer | July 8, 1952 |
| 2,686,869 | Bedford | Aug. 17, 1954 |
| 2,701,303 | Wells | Feb. 1, 1955 |
| 2,725,530 | Schroeder | Nov. 29, 1955 |
| 2,733,410 | Goodall | Jan. 31, 1956 |
| 2,773,980 | Oliver | Dec. 11, 1956 |